(12) United States Patent
Guddeti et al.

(10) Patent No.: US 11,080,158 B2
(45) Date of Patent: *Aug. 3, 2021

(54) MICROCONTROLLER AND METHOD FOR MODIFYING A TRANSMISSION SIGNAL

(71) Applicant: Infineon Technologies AG, Neubiberg (DE)

(72) Inventors: Jayakrishna Guddeti, Bangalore (IN); Deepa Chandran, Thrissur (IN); Shivaprasad Sadashivaiah, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,219

(22) Filed: Dec. 5, 2019

(65) Prior Publication Data

US 2020/0110682 A1     Apr. 9, 2020

Related U.S. Application Data

(63) Continuation of application No. 15/438,908, filed on Feb. 22, 2017, now Pat. No. 10,509,711.

(30) Foreign Application Priority Data

Feb. 29, 2016  (DE) ..................... 10 2016 203 271.2

(51) Int. Cl.
*G06F 11/263* (2006.01)
*G06F 11/22* (2006.01)

(52) U.S. Cl.
CPC ........ *G06F 11/263* (2013.01); *G06F 11/2205* (2013.01); *G06F 11/2215* (2013.01)

(58) Field of Classification Search
CPC . G06F 11/263; G06F 11/2215; G06F 11/2205
See application file for complete search history.

(56) References Cited

U.S. PATENT DOCUMENTS 5,471,176 A   11/1995  Henson
5,513,029 A    4/1996  Roberts
(Continued)

FOREIGN PATENT DOCUMENTS

WO          02/009313 A2     1/2002

OTHER PUBLICATIONS

Non-Final Office Action dated Sep. 19, 2018 in connection with U.S. Appl. No. 15/438,908.

(Continued)

*Primary Examiner* — Yair Leibovich
(74) *Attorney, Agent, or Firm* — Eschweiler & Potashnik, LLC

(57) ABSTRACT

A microcontroller includes a signal interface for transmitting signals. The microcontroller further includes an error injection module. The error injection module is configured to tap a transmission signal associated with the signal interface. The error injection module includes a synchronization unit. The synchronization unit is configured to detect within the tapped transmission signal an occurrence of a synchronization event. Further, the error injection module is configured to modify the tapped transmission signal by adding at least one disturbance to the transmission signal in synchronization with at least the detected occurrence of the synchronization event.

16 Claims, 8 Drawing Sheets

(56) References Cited

U.S. PATENT DOCUMENTS

| | | | |
|---|---|---|---|
| 6,438,462 B1 | 8/2002 | Hanf | |
| 10,509,711 B2 * | 12/2019 | Guddeti | .............. G06F 11/2215 |
| 2005/0089131 A1 * | 4/2005 | Howell | ................. G06F 21/725 |
| | | | 377/1 |
| 2009/0122842 A1 | 5/2009 | Vavik | |
| 2013/0150120 A1 | 6/2013 | Manninen | |

OTHER PUBLICATIONS

Final Office Action dated Feb. 26, 2019 in connection with U.S. Appl. No. 15/438,908.
Notice of Allowance dated Aug. 20, 2019 in connection with U.S. Appl. No. 15/438,908.

* cited by examiner

FIG 3

| Event | Count |
|---|---|
| Edge_Falling | Number of falling edges |
| Sampling_Clock | Clock ticks |
| Synchronize | First |
| Edge_Raising | Number of raising edges |
| Edge_Transition | Number of raise or fall edges |
| No_Activity | Clock ticks |
| Decode | Decode the actual value in frame |

FIG 4

| Condition 1 | Count | Stage Type |
|---|---|---|
| Edge_Falling | 1 | Frame start |
| Edge_Falling | 1 | Status |
| Edge_Falling | 7 | Data |
| Edge_Falling | 1 | Check sum |
| Edge_Falling | 1 | End of frame |

FIG 5

| Condition 1 | | &/\|\| | Condition 2 | | Stage Type |
|---|---|---|---|---|---|
| Event | Count | | Event | Count | |
| Edge_Raising | 2 | | | | Frame start |
| Sampling_Clock | 200 | & | Edge_Transition | 4 | Data |

MICROCONTROLLER AND METHOD FOR MODIFYING A TRANSMISSION SIGNAL

CROSS REFERENCE TO RELATED APPLICATIONS

This application is a continuation of U.S. application Ser. No. 15/438,908 filed Feb. 22, 2017, which claims priority to German Application No. 10 2016 203 271.2, filed on Feb. 29, 2016, and incorporated herein by reference in its entirety.

FIELD

This disclosure relates in general to microcontrollers and methods, and more particularly to a microcontroller and a method for modifying a transmission signal.

BACKGROUND

The complexity of automotive electronics—as one example for the usage of microcontroller—is still increasing. Further, there are safety requirements for testing microcontrollers and the surrounding components. Some validation has to be performed at a system level in which a microcontroller with other components form a system, to deliver one or more functions. To validate some safety requirements, it is essential to create real world scenarios using interface protocols connecting multiple components in the system with each other. Such protocols may include, but not limited to, I2C, CAN, PSI5, PSI5s, SENT, MSC and so on. It is known to submit erroneous signals to microcontrollers or the surrounding components. Used are additional elements or devices which are located outside of the system and which are difficult to use when the microcontroller or system is located and installed in the location to be used. Using these devices with a separate microcontroller or system may make it difficult or impossible to create real world scenarios.

SUMMARY

In an embodiment, a microcontroller comprises at least one signal interface for transmitting signals. The microcontroller further comprises at least one error injection module. The error injection module is configured for tapping a transmission signal associated with the signal interface. The error injection module comprises at least one synchronization unit. Further, the synchronization unit is configured for detecting within the tapped transmission signal an occurrence of at least one synchronization event. The error injection module is configured for modifying the tapped transmission signal by adding at least one disturbance to the transmission signal in synchronization with at least the detected occurrence of the synchronization event.

In a different embodiment, a method for modifying a transmission signal comprises at least the following steps: The transmission signal is tapped. Within the tapped transmission signal an occurrence of at least one synchronization event is detected. Further, the tapped transmission signal is modified by adding at least one disturbance to the transmission signal in synchronization with at least the detected occurrence of the synchronization event.

The details of one or more embodiments are set forth in the accompanying drawings and the description below. Other features, objects, and advantages will be apparent for the description and drawings, and from the claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 lists different synchronization events for decoding a data protocol of a transmission signal.

FIG. 4 lists a definition for an exemplary protocol.

FIG. 5 lists a different definition for a protocol on which a transmission signal is based.

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope.

Figure 1:
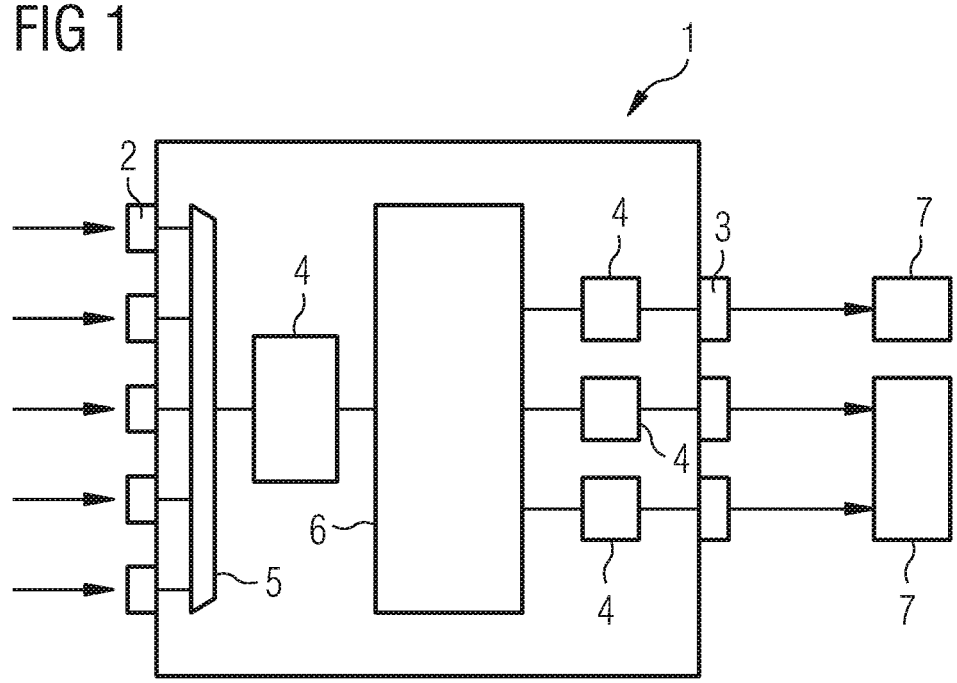
FIG. 1 shows a schematic embodiment of a microprocessor.

FIG. 1 shows a microcontroller 1 with signal interfaces 2, 3 for transmitting signals. The arrows indicate that the five signal interfaces 2 on the left side of the microcontroller 2 allows the microcontroller 1 to receive signals. Thus, these signal interfaces 2 serve as input signal interfaces. The three signal interfaces 2 on the right side of the microcontroller 1 serve as output signal interfaces 3 for the microcontroller 1.

The microcontroller 1 further comprises in the shown embodiment four error injection modules 4. The error injection module 4 at the left side is connected via a multiplexer 5 to the five signal interfaces 2 which in the shown embodiment serve as input signal interfaces. The remaining three error injection modules 4 are directly connected to the signal interfaces 3 serving as output signal interfaces.

The error injection modules 4 are configured for tapping transmission signals associated with the signal interfaces 2, 3. This implies that the single error injection module 4 on the left taps input signals received by the signal interfaces 2 and that the three error injection modules on the right 3 tap output signals which are to be output by the microcontroller 1 and which are provided in the shown embodiment by the signal processing unit 6. The output transmission signals are here submitted to external components 7.

Figure 2:
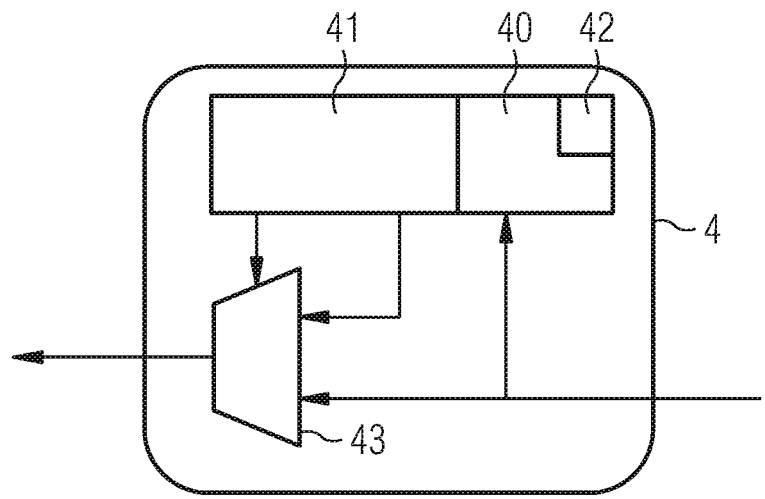
FIG. 2 illustrates schematically an embodiment of an error injection module.

FIG. 2 shows an embodiment of an error injection module 4 comprising a synchronization unit 40. The synchronization unit 40 is configured for detecting within the tapped transmission signal an occurrence of at least one synchronization event. Based on the detected transmission signal, the error injection module 4 modifies the tapped transmission signal by adding at least one disturbance to the transmission signal in synchronization with at least the detected occurrence of the synchronization event.

Thus, the error injection module 4 modifies a tapped transmission signal and turns this signal into an erroneous signal. The modified signal, hence, allows to test either a component of the microcontroller 1 or an external component.

The error injection module 4 shown in FIG. 2 comprises an error injection unit 41 which adds the disturbance to the tapped signal. The multiplexer 43 allows the error injection module 4 either to let the transmission signal pass direction through the error injection module 4 or to output the modified transmission signal. In the shown embodiment, the error injection module 4 also comprises a protocol detecting unit 42 for detecting the protocol according to which the transmission signal is given. This allows the error injection module 4 to analyze the transmission signal properly and to use the right synchronization event.

The microcontroller 1 comprises in an embodiment an on-the-fly error injection module 4 inside of the microcontroller 1 and in a different embodiment outside of the microcontroller 1. Such an on-the-fly error injection module 4 taps the interface signals and injects protocol and electrical errors, based on the error injection requirements for testing. On-the-fly error injection module 4 is in one embodiment placed close to the interfaces (for example, pads) before the transmission signal is consumed by other logic in the microcontroller 1. The error injection module can in one embodiment be configured to inject errors into output signals from microcontroller 1, in order to test other components (slave devices) in the system. In one embodiment of the microcontroller 1, there are multiple instances of error injection modules those can be used simultaneously to inject errors either on input signals or output signals, on multiple protocols. Further, in one embodiment, one error injection module 4 is multiplexed with multiple signal interfaces or different units within the microcontroller 1 to enable selection of error injection on a particular protocol and on a particular signal interface 2, 3 (pin/pad). This provides great flexibility to test different interface protocols and different pins/pads on the package, by using less number of error injection modules in one microcontroller 1.

By suppressing pulses or delaying the edges, the error injection module 4 alters data bits in the frame or the transmission signal, causes framing errors. A delay of edges in some protocols can cause electrical errors. For example, in a transmission signal associated with the SENT protocol, delaying pulse edge by more than one clock cycle causes value of nibble to changed which causes protocol error. If the delay of an edge of a pulse is within a tolerable limit, then it causes electrical variation on the interface protocol. Each interface protocol has specific framing format and data encoding mechanism. Accordingly, in one embodiment the error injection module 4 is configured to inject different types of errors (one or multiple errors) via respective disturbances to cause protocol errors and/or electrical errors on the interface protocol.

Describing the embodiments of FIG. 1 and FIG. 2 again in different words: Shown is an embodiment of on-the-fly error injection. The transmission signal is fed through the error injection module 4 and if no error being injected the same transmission signal will go to destination of the signal. While the transmission signal is transmitted on the wire, the transmission signal is monitored by the block comprising the protocol detecting unit 42, and the error injection unit 41 (also called as "Frame decoder and error injection" block). The protocol detecting unit 42 (or decoder block) recognizes different phases of protocol frame, for example, start of frame, status or identifier phase, data and checksum phase and so on. The error injection unit 41 uses this framing information to identify when to inject a disturbance as an error. Hence, the disturbance or error is added in synchronization with at least one synchronization event within the transmission signal. If the disturbed or erroneous transmission signal is requested, the error injection module 4 modifies the transmission signal (based on type of error) and selects the output multiplexer 43 to route the erroneous or modified transmission signal to the destination instead of the original transmission signal. When the original transmission signal is requested, the error injection module 4 switches the output back to original transmission signal which is hence just passed through the error injection module 4.

FIG. 3 shows an example of synchronization events and their usage for identifying different phases within the transmission signal. The phases of the different protocols are identified by detecting the events. The events are used alone or in combination with each other, e.g., by using logical operations. The phases are, for example, start of a frame, start of the data, checksum etc.

FIG. 4 shows an example in which only falling edges of pulses within the transmission signal are used. The falling edges are here the synchronization events for identifying different phases within a SENT (Single Edge Nibble Transmission) protocol.

A complex scenario is given by FIG. 5. Here, more than one synchronization event (for example, count of clock ticks and edge transition) with logical operator for their combination is used to detect a protocol phase.

Figure 6:
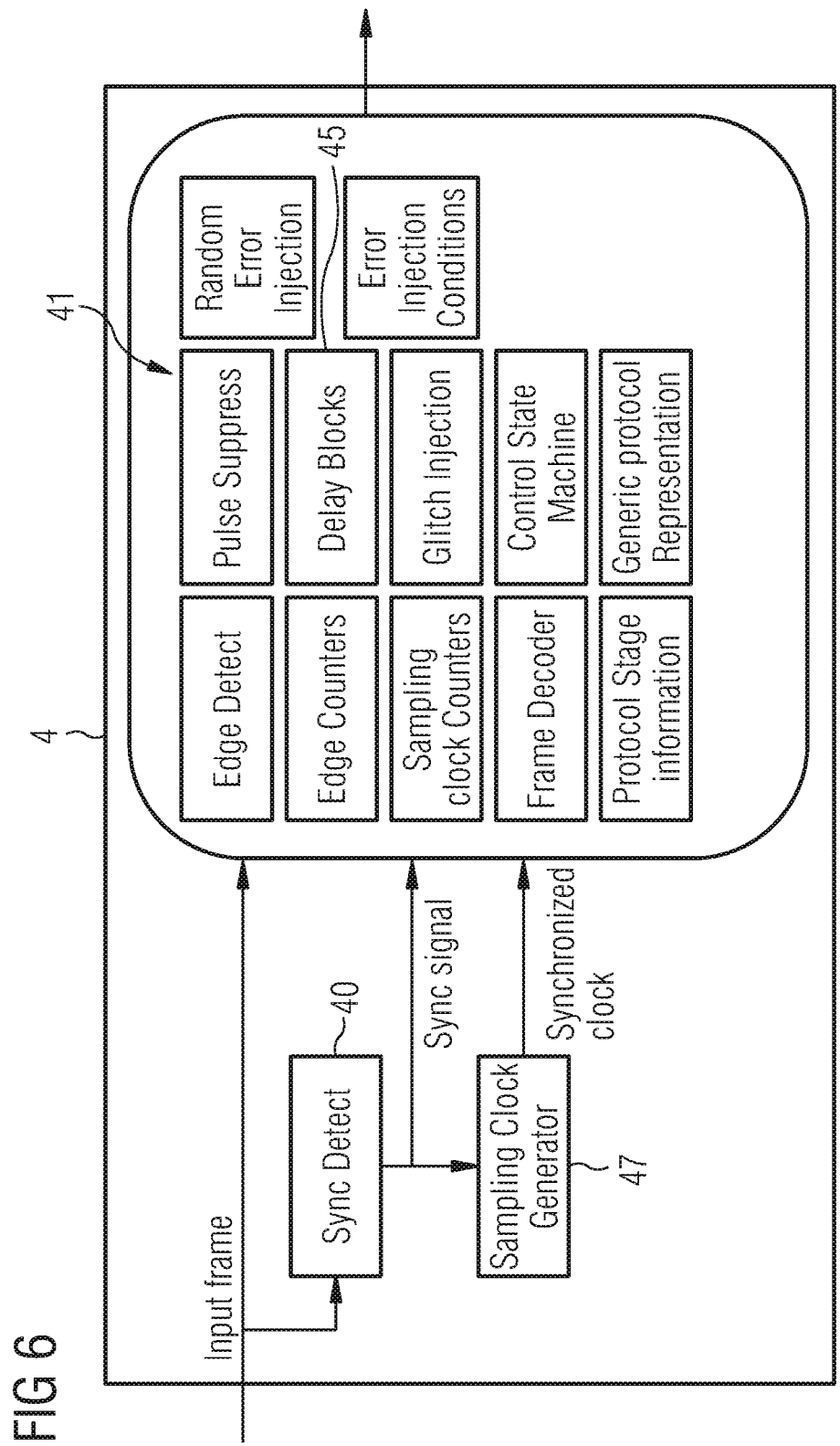
FIG. 6 shows a logic block diagram of an embodiment of an error injection module.

FIG. 6 shows an example of an error injection module 4 and describes various sub units within the error injection module 4. The tapped signal (named Input frame) is fed to a synchronization unit 40 (labeled sync detect unit), which detects start of a frame and if required any other synchronization events within the frame. To uniquely identify the start of frame, the error injection module 4 is configured to identify the protocol type (SENT, PSI5, CAN, etc). The protocol type is configured by an application using error injection module 4, as part of enabling error injection module. Start of frame may be different for different protocols and hence the sync detect module needs to be configured to detect start of frame for a particular protocol. The sync detect unit 40 contains logic to support generic programmable sync detection mechanism, which can be configured based on the protocol type. Synchronization unit 40 issues a synchronization signal based on the detected occurrence of the synchronization event to rest of error injection module 4 and to the sampling clock generator 47. The sampling clock generator 47 is a clock generation unit, which can be configured with different frequencies. On receiving sync signal from sync detect unit 40, sampling clock generator aligns the clock to sync signal and provides clock signals aligned with the synchronization signal from the synchronization unit 40. This synchronized clock 47 is used by other units in error injection module 4.

The frame decoder in this embodiment is configurable to select different events for each protocol phase and to combine multiple events using logical operators to form complex conditions. The Generic protocol representation unit provides memory to store the configurable conditions and to apply these conditions on protocol signals. The Protocol stage information unit maintains history of protocol phases and any other information required to uniquely identify a next phase in protocol. The control state machine unit monitors the protocol stage information and takes error injection conditions (either from random error injection or pre-defined conditions) and controls error injection units to apply these errors on the input signal. The components of the error injection module 4 fall in different categories. There are synchronization event detection units, protocol representation and control logic units and error injection units 41. The error injection module comprises hardware circuitry entirely or at least in part, and comprises definite structure. The shown on-the-fly error injection module 4 contains multiple error injection units 41 to be used one at a time or more than one simultaneously, depending on the kind of transmission signal or depending on the kind of test to be performed by the error injection.

Figure 7:
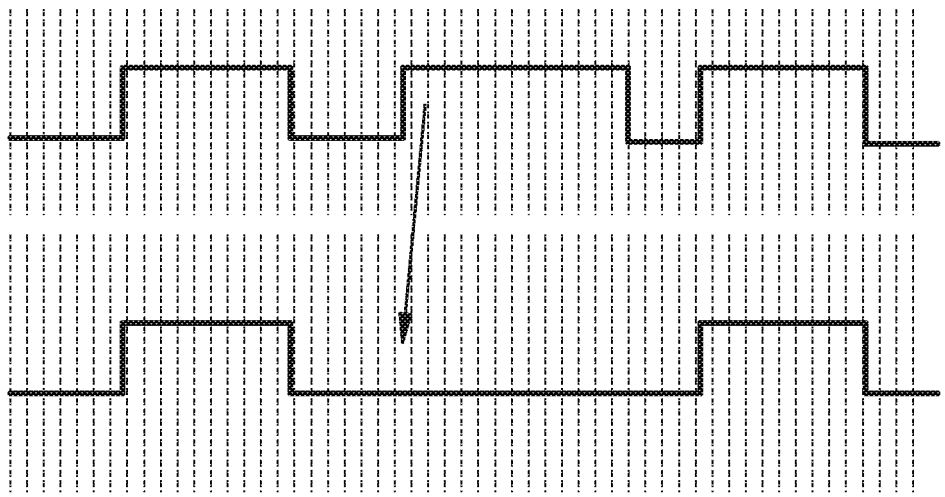
FIG. 7 shows an example of a transmission signal and the respective modified transmission signal with a suppressed high pulse.
Figure 8:
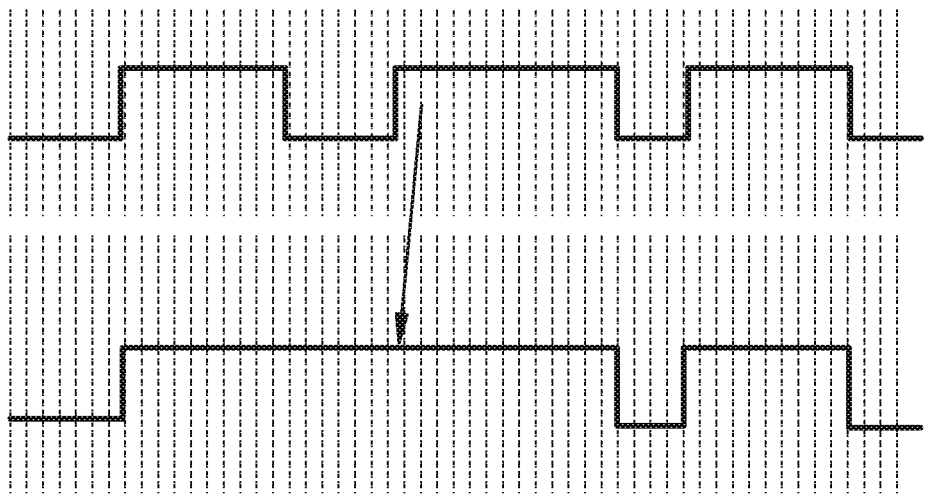
FIG. 8 shows an example of a transmission signal and the respective modified transmission signal with a suppressed low pulse.

FIG. 7 and FIG. 8 show transmission signals and modified transmissions signals after suppressing pulses. In FIG. 7 high pulses are suppressed and in FIG. 8 a low pulse is suppressed. The suppressing is accordingly the disturbance added to the transmission signal.

Figure 9:
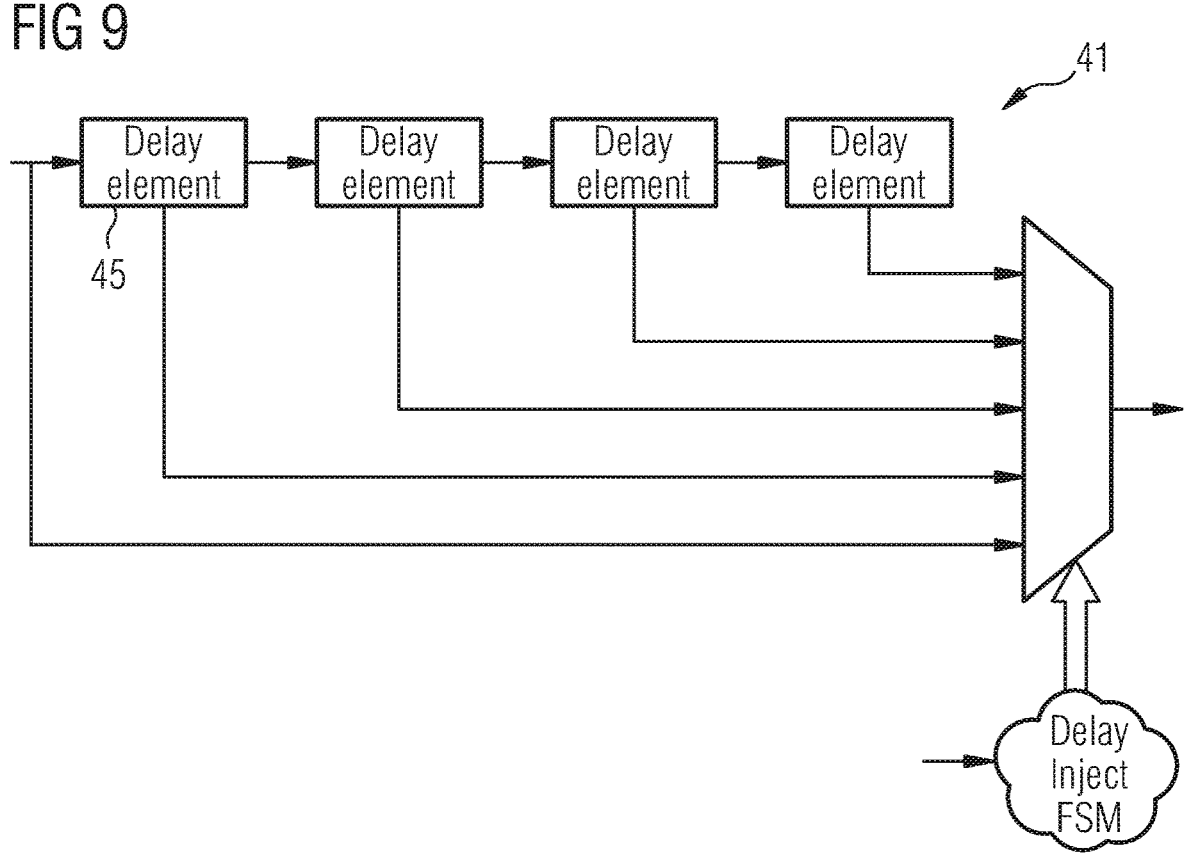
FIG. 9 shows an embodiment of a logic for causing an edge delay.

FIG. 9 shows an edge delay injection logic as part of an error injection unit 41. The control state machine receives data about the current phase of the transmission signal and controls the delay inject FSM to inject delay on the signal for a particular duration or based on event, rising/falling edge. The delay injection unit contains multiple delay elements 45 (each of which can have propagation delay in terms of pico seconds or nano seconds, based on the implementation). These delay elements 45 are connected sequentially or in series, with intermediate taps to create varying delay tapping points. The delay select signal (shown by the broad arrow) selects the output based on amount of delay to be injected at a particular error injection point.

Figure 10:
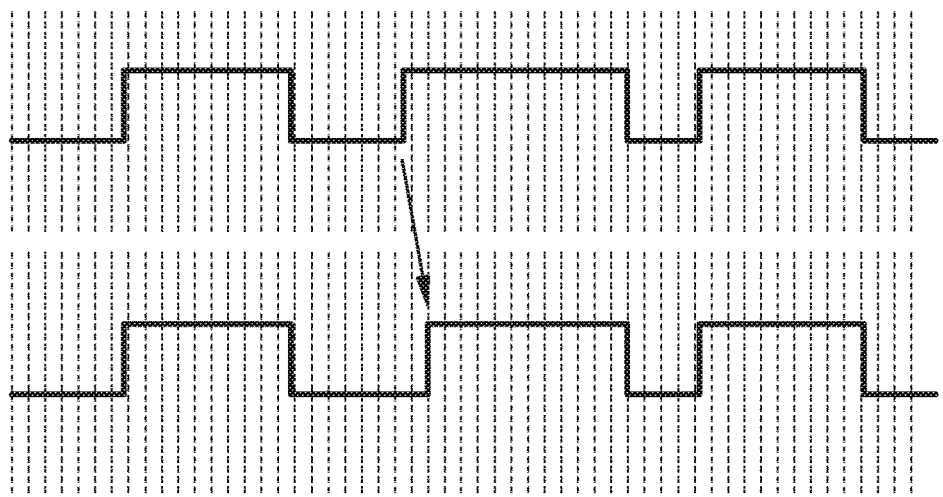
FIG. 10 shows a transmission signal and the modified transmission signal with a delayed edge.

FIG. 10 shows the result of an delayed rising edge of a pulse. The upper row shows the tapped transmission signal. As can be seen in the lower row, the edge of the pulse in the middle is delayed. Accordingly, the pulses starts later in the modified transmission line.

Figure 11:
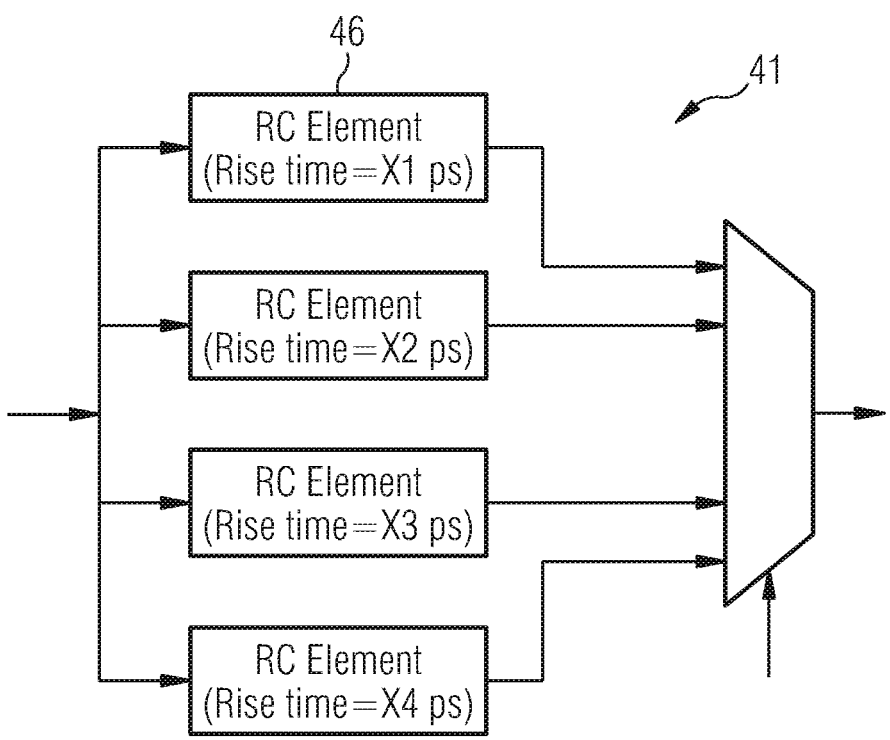
FIG. 11 shows an embodiment enabling rise or fall time variations.

FIG. 11 shows a possible implementation of a rise/fall time variation logic as one example for an error injection unit 41. The error injection unit 41 comprises various RC-elements 46 with different rise time. Hence, the RC-elements 46 have different rise/fall time characteristics. The tapped transmission signal (arrow on the left) is passed through these RC-elements 46 and one of the modified transmission signals with an accordingly modified shape of the pulses is selected for the output of the multiplexer an the right side. The arrow from below ending at the multiplexer signifies the selection of the desired modified transmission signal and via this the selection of the desired rise/fall time. Based on the configuration, either a particular modified signal will be selected for a protocol or the select different rise/fall times over time. That can create variations in rise/fall time for different pulses in the protocol frame.

Figure 12:
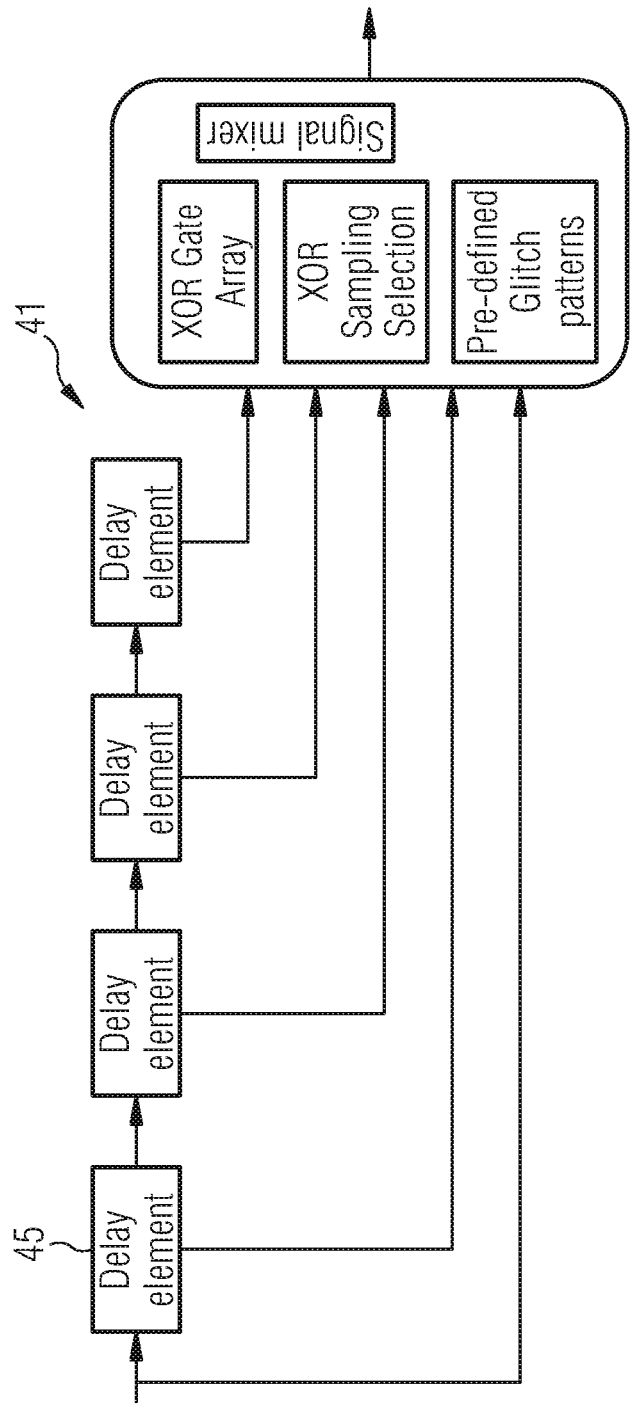
FIG. 12 shows an embodiment of a logic for adding glitches to transmission signals.
Figure 13:
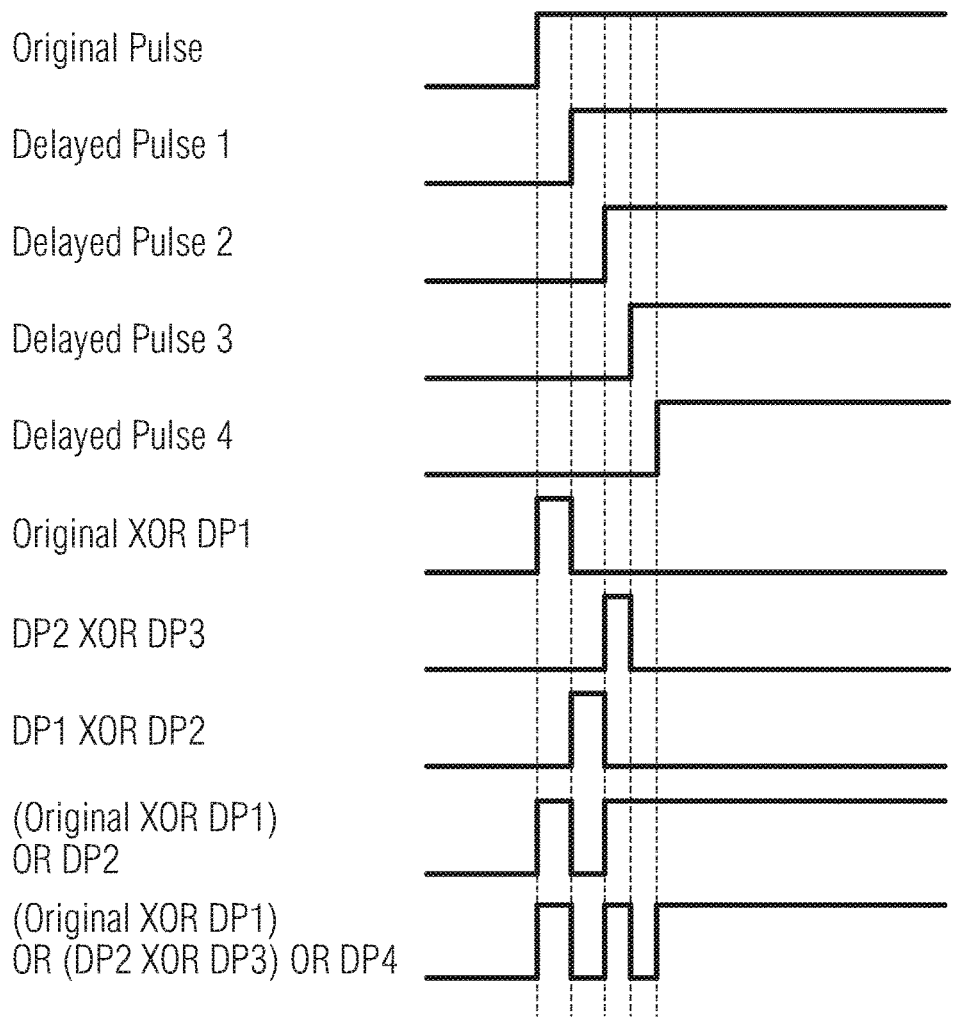
FIG. 13 shows different scenarios for a logic adding glitches.
Figure 14:
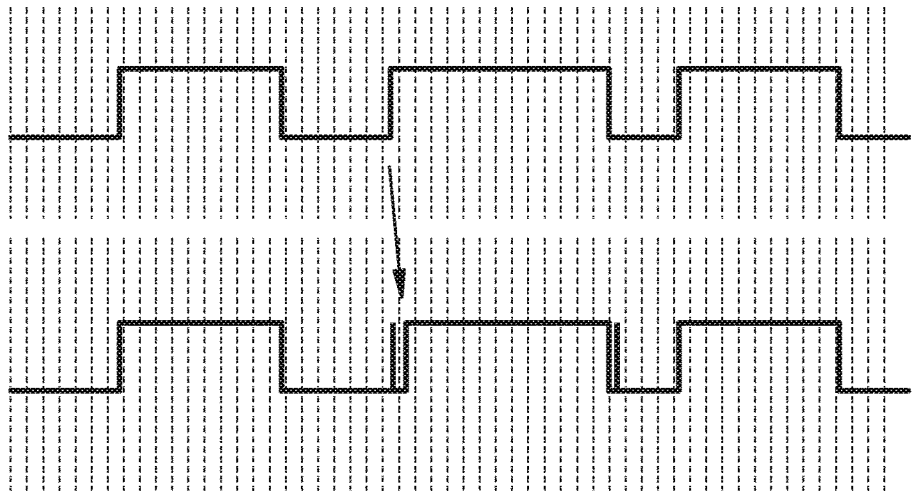
FIG. 14 shows an transmission signal and a modified transmission signal with added glitches.

FIG. 12 shows an embodiment of an error injection unit 41 comprising delay elements 45 and a glitch injection logic by using the delay elements 45 and XOR gates. The glitches are inject either at the rise edge or fall edge of a pulse (see FIG. 14). The plurality of delayed signals are combined using XOR and OR operations to inject glitches (one or multiple) at the raising edge of a pulse. Similar approach is used for glitch injection at the falling edges of pulses within the transmission signal. In another embodiment, glitch injection is performed in the middle of a pulse (either high or low pulse) by using one cycle additional pulse as input to delay elements and derive small wide pulses, those can be AND/OR with original signal to create glitch in the middle of protocol pulse. FIG. 13 shows different scenarios for the XOR logic of FIG. 12 for adding glitches to the transmission signal.

The disclosure also refers to a method for modifying a transmission signal. The method comprises at least the following steps: The transmission signal to be modified is tapped. Within the tapped transmission signal an occurrence of at least one synchronization event is detected. Further, the tapped transmission signal is modified by adding at least one disturbance to the transmission signal in synchronization with at least the detected occurrence of the synchronization event.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

As the description refers to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

The invention claimed is:

1. A device, comprising:
a signal interface for transmitting signals, and
an error injection circuit,
wherein the error injection circuit is configured to tap a transmission signal associated with the signal interface,
wherein the error injection circuit comprises a synchronization circuit,
wherein the synchronization circuit is configured to detect within the tapped transmission signal an occurrence of a synchronization event, and
wherein the error injection circuit is configured to modify the tapped transmission signal by adding at least one disturbance to the transmission signal in synchronization with at least the detected occurrence of the synchronization event.

2. The device of claim 1, wherein the transmission signal is associated with the signal interface such that the transmission signal is output by the signal interface.

3. The device of claim 1, wherein the transmission signal is associated with the signal interface such that the transmission signal is received by the signal interface.

4. The device of claim 1, wherein the synchronization event is given by an edge of a pulse of the tapped transmission signal.

5. The device of claim 1, wherein the error injection circuit is configured to suppress a pulse of the tapped transmission signal as a disturbance added to the tapped transmission signal.

6. The device of claim 1, wherein the error injection circuit is configured to delay an edge of a pulse of the tapped transmission signal as a disturbance added to the tapped transmission signal.

7. The device of claim 1, wherein the error injection circuit is configured to add a glitch to a pulse of the tapped transmission signal as a disturbance added to the tapped transmission signal.

8. The device of claim 1, wherein the error injection circuit comprises:
   at least one delay element, and
   wherein the delay element is configured to add a delay to a pulse of the tapped transmission signal.

9. The device of claim 1, wherein the error injection circuit comprises:
   a plurality of delay elements, and
   wherein at least two delay elements of the plurality of delay elements are connected in series.

10. The device of claim 1, wherein the error injection circuit comprises:
    at least one RC-element, and
    wherein the RC-element is configured to modify a shape of a pulse of the tapped transmission signal.

11. The device of claim 1, wherein the synchronization circuit is configured to provide a synchronization signal based on the detected occurrence of the synchronization event,
    wherein the error injection circuit comprises at least one sampling clock generator circuit, and
    wherein the sampling clock generator circuit is configured to provide clock signals aligned with the synchronization signal from the synchronization circuit.

12. The device of claim 1, wherein the error injection circuit is configured to produce a modified signal based on the tapped transmission signal by modifying the tapped transmission signal, and
    wherein the error injection circuit is configured such that either the error injection circuit outputs the modified signal or the transmission signal is passed through the error injection circuit.

13. The device of claim 1, wherein the error injection circuit comprises:
    a protocol detecting circuit,
    wherein the protocol detecting circuit is configured to detect a data protocol associated with the transmission signal, and
    wherein the error injection circuit is configured to modify the tapped transmission signal based on the detected data protocol.

14. The device of claim 1, wherein the device comprises:
    a plurality of error injection circuits, and
    wherein two error injection circuits of the plurality of error injection circuits are configured to modify transmission signals associated with different data protocols.

15. The device of claim 1, wherein the device comprises:
    a plurality of signal interfaces, and
    wherein the error injection circuit is connected to more than one signal interface.

16. The device of claim 1, wherein the error injection circuit is directly connected to the signal interface.

* * * * *